(12) United States Patent
Abusleme et al.

(10) Patent No.: US 12,388,088 B2
(45) Date of Patent: Aug. 12, 2025

(54) COMPOSITION FOR SECONDARY BATTERY ELECTRODES

(71) Applicant: SOLVAY SPECIALTY POLYMERS ITALY S.P.A., Bollate (IT)

(72) Inventors: Julio A. Abusleme, Saronno (IT); Andrea Vittorio Oriani, Milan (IT); Rosita Lissette Pena Cabrera, Bergamo (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 739 days.

(21) Appl. No.: 17/625,573

(22) PCT Filed: Aug. 3, 2020

(86) PCT No.: PCT/EP2020/071803
§ 371 (c)(1),
(2) Date: Jan. 7, 2022

(87) PCT Pub. No.: WO2021/023707
PCT Pub. Date: Feb. 11, 2021

(65) Prior Publication Data
US 2022/0293949 A1    Sep. 15, 2022

(30) Foreign Application Priority Data
Aug. 7, 2019   (EP) .................................... 19190460

(51) Int. Cl.
| | | |
|---|---|---|
| *H01M 4/62* | (2006.01) |
| *H01M 4/04* | (2006.01) |
| *H01M 4/131* | (2010.01) |
| *H01M 4/1391* | (2010.01) |
| *H01M 4/505* | (2010.01) |
| *H01M 4/525* | (2010.01) |

(52) U.S. Cl.
CPC .......... *H01M 4/623* (2013.01); *H01M 4/0404* (2013.01); *H01M 4/0471* (2013.01); *H01M 4/131* (2013.01); *H01M 4/1391* (2013.01); *H01M 4/505* (2013.01); *H01M 4/525* (2013.01)

(58) Field of Classification Search
CPC .............................. H01M 4/622; H01M 4/623
See application file for complete search history.

(56) References Cited

U.S. PATENT DOCUMENTS

| | | | |
|---|---|---|---|
| 4,016,345 A | 4/1977 | Holmes | |
| 4,725,644 A | 2/1988 | Malhotra | |
| 5,597,661 A * | 1/1997 | Takeuchi | ........... C08G 65/3322 252/500 |
| 6,479,591 B2 | 11/2002 | Kapeliouchko et al. | |
| 2006/0148912 A1* | 7/2006 | Katsurao | ................ B01D 69/02 521/27 |
| 2010/0133482 A1* | 6/2010 | Abusleme | ........... C08F 214/225 252/511 |
| 2013/0273424 A1 | 10/2013 | Watanabe et al. | |
| 2018/0248193 A1* | 8/2018 | Sakai | .................. H01M 4/0404 |

FOREIGN PATENT DOCUMENTS

| | | |
|---|---|---|
| JP | H07201315 A | 8/1995 |
| WO | 2008129041 A1 | 10/2008 |
| WO | 2019101806 A1 | 5/2019 |
| WO | 2021023709 A1 | 2/2021 |

* cited by examiner

*Primary Examiner* — Matthew W Van Oudenaren
(74) *Attorney, Agent, or Firm* — Osha Bergman Watanabe & Burton LLP

(57) ABSTRACT

The present invention pertains to electrode-forming compositions, to the use of said electrode-forming compositions in a process for the manufacture of electrodes, to said electrodes and to electrochemical devices such as secondary batteries comprising said electrodes.

16 Claims, No Drawings

COMPOSITION FOR SECONDARY BATTERY ELECTRODES

CROSS-REFERENCE TO RELATED APPLICATIONS

This application is a U.S. national stage entry under 35 U.S.C. § 371 of International Application No. PCT/EP2020/071803 filed Aug. 3, 2020, which claims priority to European application No. 19190460.6, filed on Aug. 7, 2019. The entire contents of these applications are explicitly incorporated herein by this reference.

TECHNICAL FIELD

The present invention pertains to electrode-forming compositions, to the use of said electrode-forming compositions in a process for the manufacture of electrodes, to said electrodes and to electrochemical devices such as secondary batteries comprising said electrodes.

BACKGROUND ART

Electrochemical devices such as secondary batteries typically comprise a positive electrode, a negative electrode, a separator and an electrolyte.

Electrodes for secondary batteries are usually produced by applying an electrode forming composition onto a metal substrate also known as "current collector". The electrode forming compositions are typically formed by mixing a binder with a powdery electro active compound and optionally other ingredients such as solvents, materials to enhance conductivity and/or control viscosity. The binder is a key component of electrodes because it must ensure good adhesion to the current collector and to the electro active compounds, thus allowing the electro active material to transfer electrons as required. Current commercial batteries typically use graphite as electro active compound in the anode, and mixed oxides containing nickel and lithium as electro active compounds in the cathode. The electrode forming composition is typically applied on the current collector and dried. The resulting sheet is normally calendered or otherwise mechanically treated and rolled. Individual electrodes are then cut out from this sheet.

Fluoropolymers are known in the art to be suitable as binders for the manufacture of electrodes for use in electrochemical devices such as secondary batteries.

In the related art, vinylidene fluoride polymers (PVDF) have been used as electrode binder of nonaqueous electrolyte secondary batteries. Generally, PVDF homopolymer has poor adhesion to metal. In order to face this problem, several solutions have been proposed. As an example, in WO 2008/129041 it has been demonstrated that including certain recurring units derived from a (meth)acrylic monomer improves the adhesion to metal of PVDF polymers.

Nevertheless, the need still exists of binders having even better adhesion.

Increasing the PVDF molecular weight is known to increase the performances of binders comprising said polymer, in particular in terms of adhesion to metals.

However, an increase in molecular weight of a vinylidene fluoride polymer leads to longer time for dissolution in polar solvents and to an increased viscosity of the said solutions, which may limit the coating applicability of electrode-forming compositions comprising the same.

The molecular weight of fluorinated copolymers comprising pendant functional group included in electrode binders can be increased by thermal crosslinking.

JPH07201315A discloses that an electrode binder obtained by thermally crosslinking polyvinylidene fluoride having a hydroxyl group with a polymer having an isocyanate group is used as an electrode binder.

US 2018/0248193 discloses a method of improving adhesion of fluorine based polymers to metal and to active materials in electrodes by submitting an electrode prepared by using a fluorine based polymer including at least one side chain comprising a carboxyl group to a heat treatment to form a crosslinked structure. In a preferred embodiment, the electrode is prepared by using an electrode mixture further comprising a second fluorine based polymer having side chains including a hydroxyl group.

There is still a need in the art for both positive and negative electrodes which advantageously enable manufacturing electrochemical devices exhibiting outstanding capacity values and good adhesion to metal substrates.

The present invention addresses this need by providing a new electrode forming composition which comprises vinylidene fluoride polymers including certain side chains including hydroxyl groups and certain side chains including carboxyl group and which is able to show a surprising adhesion performance when used both in positive and in negative electrodes.

SUMMARY OF INVENTION

The present invention relates to an electrode forming composition (C) comprising:
- (a) at least one vinylidene fluoride (VDF) copolymer [polymer (A)] that comprises:
  - (i) recurring units derived from vinylidene fluoride (VDF);
  - (ii) recurring units derived from at least one hydroxyl group-containing vinyl monomer (HA);
  - (iii) recurring units derived from at least one carboxyl group-containing vinyl monomer (CA);

wherein the total amount of recurring units derived from monomer (HA) and recurring units derived from monomer (CA) in said polymer (A) is of at most 10.0% by moles, preferably at most 5.0% by moles, more preferably at most 1.5% by moles, with respect to the total moles of recurring units of polymer (A); and wherein a fraction of at least 40% of recurring units derived from monomer (HA) and a fraction of at least 40% of recurring units derived from monomer (CA) are randomly distributed into said polymer (A);
- (b) at least one electro-active material (AM);
- (c) at least one solvent (S).

It has been found that incorporating into a vinylidene fluoride backbone certain monomers that can undergo crosslinking provides crosslinkable vinylidene fluoride copolymers that can be suitably used as binders in electrode forming composition. Said crosslinkable vinylidene fluoride copolymers can be thermally crosslinked once the electrode forming composition is casted onto the current collector in a process for preparing electrodes, thus providing an electrode having improved performances, in particular in terms of adhesion to metals.

In a further aspect the present invention relates to a process for the manufacture of an electrode using an electrode forming composition (C) as described above, said process comprising:

(i) providing a metal substrate having at least one surface;
(ii) providing an electrode-forming composition (C) as defined above;
(iii) applying the composition (C) provided in step (ii) onto the at least one surface of the metal substrate provided in step (i), thereby providing an assembly comprising a metal substrate coated with said composition (C) onto the at least one surface;
(iv) drying the assembly provided in step (iii).

Drying in step (iv) is preferably carried out at a temperature comprised between 50° C. to 200° C., preferably between 80° C. to 180° C., for a time comprised between 5 minutes and 48 hours, preferably between 30 minutes and 24 hours.

In a further aspect the present invention relates to an electrode obtainable from such a process.

In a further aspect the present invention relates to an electrochemical device comprising said electrode.

The electrode-forming composition (C) of the present invention is particularly suitable for the manufacturing of positive electrodes for electrochemical devices.

DESCRIPTION OF EMBODIMENTS

By the term "recurring unit derived from vinylidene fluoride" (also generally indicated as vinylidene difluoride 1,1-difluoroethylene, VDF), it is intended to denote a recurring unit of formula $CF_2=CH_2$.

Suitable hydroxyl group-containing vinyl monomers (HA) are compounds of formula (I):

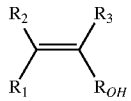

(I)

wherein:
$R_1$, $R_2$ and $R_3$, equal to or different from each other, are independently selected from a hydrogen atom, a halogen atom, and a $C_1$-$C_3$ hydrocarbon group and $R_{OH}$ is a $C_2$-$C_{10}$ hydrocarbon chain moiety comprising at least one hydroxyl group and possibly containing in the chain one or more oxygen atoms, carbonyl groups or carboxy groups.

In a preferred embodiment, monomers (HA) are compounds of formula (Ia):

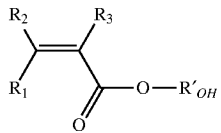

(Ia)

wherein:
$R_1$, $R_2$ and $R_3$, equal to or different from each other, are independently selected from a hydrogen atom and a $C_1$-$C_3$ hydrocarbon group and $R'_{OH}$ is a $C_1$-$C_5$ hydrocarbon moiety comprising at least one hydroxyl group.

Non-limitative examples of monomers (HA) of formula (Ia) include, notably:
hydroxyethyl(meth)acrylate (HEA),
2-hydroxypropyl acrylate (HPA),
hydroxyethylhexyl(meth)acrylate,
and mixtures thereof.

Preferably, the at least one monomer (HA) is hydroxyethyl(meth)acrylate (HEA).

Suitable carboxyl group-containing vinyl monomers (CA) are compounds of formula (II):

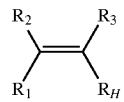

(II)

wherein:
$R_1$, $R_2$ and $R_3$, equal to or different from each other, are independently selected from a hydrogen atom and a $C_1$-$C_3$ hydrocarbon group and $R_H$ is a $C_1$-$C_{10}$ hydrocarbon chain moiety comprising at least one carboxyl group.

In a preferred embodiment, monomers (CA) are compounds of formula (IIa):

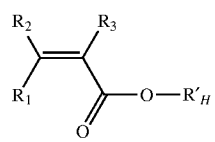

(IIa)

wherein
$R_1$, $R_2$ and $R_3$, equal to or different from each other, are independently selected from a hydrogen atom and a $C_1$-$C_3$ hydrocarbon group and R'H is a hydrogen or a $C_1$-$C_5$ hydrocarbon moiety comprising at least one carboxyl group.

Non-limitative examples of monomers (CA) of formula (IIa) include, notably:
acrylic acid (AA) and
(meth)acrylic acid,
and mixtures thereof.

Preferably, the at least one monomer (CA) is acrylic acid (AA).

The molar ratio between recurring units (ii) and recurring units (iii) in polymer (A) is preferably comprised in the range from 20:1 to 1:20, preferably from 10:1 to 1:10, more preferably from 1:2 to 2:1; still more preferably, the molar ratio is 1:1.

It is essential that in polymer (A) a fraction of at least 40% of monomer (HA) and a fraction of at least 40% of monomer (CA) are randomly distributed into said polymer (A).

The expression "fraction of randomly distributed monomer (HA)" is intended to denote the percent ratio between the average number of (HA) monomer sequences (%), said sequences being comprised between two recurring units derived from VDF monomer, and the total average number of (MA) monomer recurring units (%), according to the following formula:

$$\text{Fraction of randomly distributed units } (HA) = \frac{\text{average number of } (HA) \text{ sequences } (\%)}{\text{average total number of } (HA) \text{ units } (\%)} \cdot 100$$

When each of the (HA) recurring units is isolated, that is to say comprised between two recurring units of VDF monomer, the average number of (HA) sequences equal the average total number of (HA) recurring units, so the fraction of randomly distributed units (HA) is 100%: this value corresponds to a perfectly random distribution of (HA) recurring units.

Thus, the larger is the number of isolated (HA) units with respect to the total number of (HA) units, the higher will be the percentage value of fraction of randomly distributed units (HA), as above described.

The expression "fraction of randomly distributed monomer (CA)" is intended to denote the percent ratio between the average number of (CA) monomer sequences (%), said sequences being comprised between two recurring units derived from VDF monomer, and the total average number of (CA) monomer recurring units (%), according to the following formula:

$$\text{Fraction of randomly distributed units (CA)} = \frac{\text{average number of (CA) sequences (\%)}}{\text{average total number of (CA) units (\%)}} \cdot 100$$

When each of the (CA) recurring units is isolated, that is to say comprised between two recurring units of VDF monomer, the average number of (CA) sequences equal the average total number of (CA) recurring units, so the fraction of randomly distributed units (HA) is 100%: this value corresponds to a perfectly random distribution of (CA) recurring units. Thus, the larger is the number of isolated (CA) units with respect to the total number of (CA) units, the higher will be the percentage value of fraction of randomly distributed units (CA), as above described.

Determination of total average number of (HA) monomer recurring units and of (CA) monomer recurring units in polymer (A) can be performed by any suitable method, NMR being preferred.

The fraction of randomly distributed units (HA) and (CA) is preferably of at least 50%, more preferably of at least 60%.

Polymer (A) comprises preferably at least 0.01% by moles, more preferably at least 0.05% by moles of recurring units derived from said monomer (HA).

Polymer (A) comprises preferably at most 5.0% by moles, more preferably at most 3.0% by moles, even more preferably at most 1.5% by moles of recurring units derived from monomer (HA).

Polymer (A) comprises preferably at least 0.1% by moles, more preferably at least 0.2% by moles of recurring units derived from said monomer (CA).

Polymer (A) comprises preferably at most 7.0% moles, more preferably at most 5.0% by moles, even more preferably at most 3.0% by moles of recurring units derived from monomer (CA).

Excellent results have been obtained using a polymer (A) comprising at least 70% by moles of recurring units derived from VDF.

The polymer (A) can be an elastomer or a semi-crystalline polymer, preferably being a semi-crystalline polymer.

As used herein, the term "semi-crystalline" means a fluoropolymer that has, besides the glass transition temperature Tg, at least one crystalline melting point on DSC analysis. For the purposes of the present invention a semi-crystalline fluoropolymer is hereby intended to denote a fluoropolymer having a heat of fusion determined according to ASTM D 3418 of advantageously at least 0.4 J/g, preferably of at least 0.5 J/g, more preferably of at least 1 J/g.

To the purpose of the invention, the term "elastomer" is intended to designate a true elastomer or a polymer resin serving as a base constituent for obtaining a true elastomer.

True elastomers are defined by the ASTM, Special Technical Bulletin, No. 184 standard as materials capable of being stretched, at room temperature, to twice their intrinsic length and which, once they have been released after holding them under tension for 5 minutes, return to within 10% of their initial length in the same time.

Preferably, the intrinsic viscosity of polymer (A), measured in dimethylformamide at 25° C., is comprised between 0.05 l/g and 0.60 l/g, more preferably between 0.15 l/g and 0.50 l/g even more preferably between 0.20 l/g and 0.45 l/g.

The polymer (A) of the present invention usually has a melting temperature (Tm) comprised in the range from 120 to 200° C.

The melting temperature may be determined from a DSC curve obtained by differential scanning calorimetry (hereinafter, also referred to as DSC). In the case where the DSC curve shows a plurality of melting peaks (endothermic peaks), the melting temperature (Tm) is determined on the basis of the peak having the largest peak area.

The polymer (A) may further comprise recurring units derived from one or more fluorinated comonomers (CF) different from VDF.

By the term "fluorinated comonomer (CF)", it is hereby intended to denote an ethylenically unsaturated comonomer comprising at least one fluorine atoms.

Non-limitative examples of suitable fluorinated comonomers (CF) include, notably, the followings:
(a) $C_2$-$C_8$ fluoro- and/or perfluoroolefins such as tetrafluoroethylene (TFE), hexafluoropropylene (HFP), pentafluoropropylene and hexafluoroisobutylene;
(b) $C_2$-$C_8$ hydrogenated monofluoroolefins, such as vinyl fluoride; 1,2-difluoroethylene and trifluoroethylene;
(c) perfluoroalkylethylenes of formula $CH_2$=CH—$R_{f0}$, wherein $R_{f0}$ is a $C_1$-$C_6$ perfluoroalkyl group;
(d) chloro- and/or bromo- and/or iodo-$C_2$-$C_6$ fluoroolefins such as chlorotrifluoroethylene (CTFE).

In one embodiment of the invention, polymer (A) comprises from 0.1 to 10.0% by moles, preferably from 0.3 to 5.0% by moles, more preferably from 0.5 to 3.0% by moles of recurring units derived from said fluorinated comonomer (CF).

It is understood that chain ends, defects or other impurity-type moieties might be comprised in the polymer (A) without these impairing its properties.

The polymer (A) more preferably comprises recurring units derived from:
at least 70% by moles, preferably at least 75% by moles, more preferably at least 85% by moles of vinylidene fluoride (VDF),
from 0.01% to 3.0% by moles, preferably from 0.05% to 1.5% by moles, more preferably from 0.08% to 1.0% by moles of at least one hydroxyl group-containing vinyl monomer (HA);
from 0.05% to 3.0% by moles, preferably from 0.1% to 1.5% by moles, more preferably from 0.15% to 1.0% by moles of at least one carboxyl group-containing vinyl monomer (CA);
optionally from 0.5 to 3.0% by moles of recurring units derived from at least one fluorinated comonomer (CF).

The procedure for preparing the polymer (A) comprises polymerizing in an aqueous medium in the presence of a radical initiator the vinylidene fluoride (VDF) monomer, monomer (HA) and monomer (CA), and optionally comonomer (CF), in a reaction vessel, said process comprising continuously feeding an aqueous solution comprising monomer (HA) and monomer (CA); and maintaining the pressure in said reactor vessel exceeding the critical pressure of the vinylidene fluoride.

During the whole polymerization run, pressure is maintained above critical pressure of vinylidene fluoride. Generally, the pressure is maintained at a value of more than 50 bars, preferably of more than 75 bars, even more preferably of more than 100 bars.

Generally, the polymerization is carried out at a temperature comprised in the range of from 5° C. to 130° C.

The polymerization can be carried out either in suspension in organic medium, typically following the procedures described, for example, in WO 2008129041, or in aqueous emulsion, typically carried out as described in the art (see e.g. U.S. Pat. Nos. 4,016,345, 4,725,644 and 6,479,591).

It is essential that a continuous feeding of an aqueous solution containing monomer (HA) and monomer (CA) is carried out during the polymerization run.

It is thus possible to obtain a nearly statistic distribution of both the monomer (HA) and monomer (CA) within the VDF monomer polymer backbone of polymer (A).

The expressions "continuous feeding" or "continuously feeding" means that slow, small, incremental additions the aqueous solution of monomer (HA) and monomer (CA) take place for most of the polymerization duration, at least until the conversion of 70% by moles of the VDF monomer.

The aqueous solution of monomer (HA) and monomer (CA) continuously fed during polymerization amounts for at least 50% by weight of the total amount of monomer (HA) and monomer (CA) supplied during the reaction (i.e. initial charge plus continuous feed). Preferably at least 60% by weight, more preferably at least 70% by weight, most preferably at least 80% by weight of the total amount of monomer (HA) and monomer (CA) is continuously fed during polymerization. An incremental addition of VDF monomer can be effected during polymerization, even if this requirement is not mandatory.

Generally, the process of the invention is carried out at a temperature of at least 35° C., preferably of at least 40° C., more preferably of at least 45° C.

When the polymerization is carried out in suspension, polymer (A) is typically provided in form of powder.

When the polymerization to obtain polymer (A) is carried out in emulsion, polymer (A) is typically provided in the form of an aqueous dispersion (D), which may be used as directly obtained by the emulsion polymerization or after a concentration step. Preferably, the solid content of polymer (A) in dispersion (D) is in the range comprised between 20 and 50% by weight.

Polymer (A) obtained by emulsion polymerization can be isolated from the aqueous dispersion (D) by concentration and/or coagulation of the dispersion and obtained in powder form by subsequent drying.

Polymer (A) in the form of powder may be optionally further extruded to provide polymer (A) in the form of pellets.

Extrusion is suitably carried out in an extruder. Duration of extrusion suitably ranges from few seconds to 3 minutes.

The polymer (A) may be dissolved in any suitable organic solvent to provide a solution (Sol) of polymer (A). Preferably, the solid content of polymer (A) in solution (Sol) is in the range comprised between 2 and 30% by weight.

Non-limitative examples of suitable organic solvents for dissolving polymer (A) are N-methyl-2-pyrrolidone (NMP), N,N-dimethylformamide, N,N-dimethylacetamide, dimethylsulfoxide, hexamethylphosphamide, dioxane, tetrahydrofuran, tetramethylurea, triethyl phosphate, and trimethyl phosphate, aliphatic ketones, cycloaliphatic ketones, cycloaliphatic esters. These organic solvents may be used singly or in mixture of two or more species.

The electrode forming compositions (C) of the present invention include one or more electro-active materials (AM). For the purpose of the present invention, the term "electro-active material" is intended to denote a compound which is able to incorporate or insert into its structure and substantially release therefrom alkaline or alkaline-earth metal ions during the charging phase and the discharging phase of an electrochemical device. The electro active material is preferably able to incorporate or insert and release lithium ions.

The nature of the electro active material in the electrode forming composition of the invention depends on whether said composition is used in the manufacture of a positive electrode or a negative electrode.

In the case of forming a positive electrode for a Lithium-ion secondary battery, the electro active compound may comprise a Lithium containing compound.

In one preferred embodiment the lithium containing compound can be a metal chalcogenide of formula $LiMQ_2$, wherein M is at least one metal selected from transition metals such as Co, Ni, Fe, Mn, Cr and V and Q is a chalcogen such as O or S. Among these, it is preferred to use a lithium-based metal oxide of formula $LiMO_2$, wherein M is the same as defined above. Preferred examples thereof may include $LiCoO_2$, $LiNiO_2$, $LiNi_xCo_{1-x}O_2$ ($0<x<1$) and spinel-structured $LiMn_2O_4$.

In another embodiment, still in the case of forming a positive electrode for a Lithium-ion secondary battery, the electro active compound may comprise a lithiated or partially lithiated transition metal oxyanion-based electro-active material of formula $M_1M_2(JO_4)_fE_{1-f}$ wherein $M_1$ is lithium, which may be partially substituted by another alkali metal representing less than 20% of the $M_1$ metals, $M_2$ is a transition metal at the oxidation level of +2 selected from Fe, Mn, Ni or mixtures thereof, which may be partially substituted by one or more additional metals at oxidation levels between +1 and +5 and representing less than 35% of the $M_2$ metals, $JO_4$ is any oxyanion wherein J is either P, S, V, Si, Nb, Mo or a combination thereof, E is a fluoride, hydroxide or chloride anion, f is the molar fraction of the $JO_4$ oxyanion, generally comprised between 0.75 and 1.

The $M_1M_2(JO_4)_fE_{1-f}$ electro-active material as defined above is preferably phosphate-based and may have an ordered or modified olivine structure.

More preferably, the electro active compound in the case of forming a positive electrode has formula $Li_{3-x}M'_yM''_{2-y}(JO_4)_3$ wherein $0 \leq x \leq 3$, $0 \leq y \leq 2$, M' and M'' are the same or different metals, at least one of which being a transition metal, $JO_4$ is preferably $PO_4$ which may be partially substituted with another oxyanion, wherein J is either S, V, Si, Nb, Mo or a combination thereof. Still more preferably, the electro active compound is a phosphate-based electro-active material of formula $Li(Fe_xMn_{1-x})PO_4$ wherein $0 \leq x \leq 1$, wherein x is preferably 1 (that is to say, lithium iron phosphate of formula $LiFePO_4$).

In a most preferred embodiment, the electro active material for a positive electrode is selected from lithium-containing complex metal oxides of general formula (III)

$$LiNi_xM1_yM2_zY_2 \qquad (III)$$

wherein M1 and M2 are the same or different from each other and are transition metals selected from Co, Fe, Mn, Cr and V, $0.5 \leq x \leq 1$, wherein $y+z=1-x$, and Y denotes a chalcogen, preferably selected from O and S.

The electro active material in this embodiment is preferably a compound of formula (III) wherein Y is O. In a further preferred embodiment, M1 is Mn and M2 is Co or M1 is Co and M2 is Al.

Examples of such active materials include $LiNi_xMn_yCo_zO_2$, herein after referred to as NMC, and $LiNi_xCo_yAl_zO_2$, herein after referred to as NCA.

Specifically with respect to $LiNi_xMn_yCo_zO_2$, varying the content ratio of manganese, nickel, and cobalt can tune the power and energy performance of a battery.

In a particularly preferred embodiment of the present invention, the compound AM is a compound of formula (III) as above defined, wherein $0.5 \leq x \leq 1$, $0.1 \leq y \leq 0.5$, and $0 \leq z \leq 0.5$.

Non limitative examples of suitable electro active materials for positive electrode of formula (III) include, notably:
$LiNi_{0.5}Mn_{0.3}Co_{0.2}O_2$,
$LiNi_{0.6}Mn_{0.2}Co_{0.2}O_2$,
$LiNi_{0.8}Mn_{0.1}Co_{0.1}O_2$,
$LiNi_{0.8}Co_{0.15}Al_{0.05}O_2$,
$LiNi_{0.8}Co_{0.2}O_2$,
$LiNi_{0.8}Co_{0.15}Al_{0.05}O_2$,
$LiNi_{0.6}Mn_{0.2}Co_{0.2}O_2$
$LiNi_{0.8}Mn_{0.1}Co_{0.1}O_2$,
$LiNi_{0.9}Mn_{0.05}Co_{0.05}O_2$.
The compounds:
$LiNi_{0.8}Co_{0.15}Al_{0.05}O_2$,
$LiNi_{0.6}Mn_{0.2}Co_{0.2}O_2$,
$LiNi_{0.8}Mn_{0.1}Co_{0.1}O_2$,
$LiNI_{0.9}Mn_{0.05}Co_{0.05}O_2$.
are particularly preferred.

In the case of forming a negative electrode for a Lithium-ion secondary battery, the electro active compounds may preferably comprise one or more carbon-based materials and/or one or more silicon-based materials.

In some embodiments, the carbon-based materials may be selected from graphite, such as natural or artificial graphite, graphene, or carbon black. These materials may be used alone or as a mixture of two or more thereof. The carbon-based material is preferably graphite.

The silicon-based compound may be one or more selected from the group consisting of chlorosilane, alkoxysilane, aminosilane, fluoroalkylsilane, silicon, silicon chloride, silicon carbide and silicon oxide. More particularly, the silicon-based compound may be silicon oxide or silicon carbide.

When present in the electro active compounds, the silicon-based compounds are comprised in an amount ranging from 1 to 60% by weight, preferably from 5 to 20% by weight with respect to the total weight of the electro active compounds.

The electrode forming compositions of the invention comprise at least one solvent (S).

The solvent for a negative electrode forming composition may comprise and can preferably be water. This allows reducing the overall use of organic solvents with a consequent reduction of costs, reduction of flammable material and reduced environmental impact.

The solvent in positive electrode forming composition comprises one or more organic solvents, preferably polar solvents, examples of which may include: N-methyl-2-pyrrolidone, N,N-dimethylformamide, N,N-dimethylacetamide, dimethylsulfoxide, hexamethylphosphamide, dioxane, tetrahydrofuran, tetramethylurea, triethyl phosphate, and trimethyl phosphate. These organic solvents may be used singly or in mixture of two or more species.

The electrode forming compositions (C) of the present invention typically comprise from 0.5% by weight to 10% by weight, preferably from 0.7% by weight to 5% by weight of polymer (A). The compositions also comprise from 80% by weight to 99% by weight of electro active material(s), all percentages being weight percentages over the total solid content of composition (C).

By the term "total solid content" it is intended "all the ingredients of the electrode forming composition of the invention excluding the solvent".

In general in the electrode forming compositions of the present invention the solvent is present in an amount of from 10% by weight to 90% by weight of the total amount of the composition (C). In particular for negative electrode forming composition the solvent is preferably present in an amount of from 25% by weight to 75% by weight, more preferably from 30% by weight to 60% by weight of the total amount of the composition.

For positive electrode forming compositions the solvent is preferably present in an amount of from 5% by weight to 60% by weight, more preferably from 15% by weight to 40% by weight of the total amount of the composition.

The electrode forming compositions of the present invention may further include one or more optional conductive agents in order to improve the conductivity of a resulting electrode made from the composition of the present invention. Conducting agents for batteries are known in the art.

Examples thereof may include: carbonaceous materials, such as carbon black, graphite fine powder carbon nanotubes, graphene, or fiber, or fine powder or fibers of metals such as nickel or aluminum. The optional conductive agent is preferably carbon black. Carbon black is available, for example, under the brand names, Super P® or Ketjenblack®.

When present, the conductive agent is different from the carbon-based material described above.

The amount of optional conductive agent is preferably from 0 to 30% by weight with respect to the total solids in the electrode forming composition. In particular, for positive electrode forming compositions the optional conductive agent is typically from 0% by weight to 10% by weight, more preferably from 0% by weight to 5% by weight of the total amount of the solids within the composition (C).

For negative electrode forming compositions which are free from silicon based electro active compounds the optional conductive agent is typically from 0% by weight to 5% by weight, more preferably from 0% by weight to 2% by weight of the total amount of the solids within the composition, while for negative electrode forming compositions comprising silicon based electro active compounds it has been found to be beneficial to introduce a larger amount of optional conductive agent, typically from 5% by weight to 20% by weight of the total amount of the solids within the composition (C).

The electrode forming compositions of the present invention may further include at least one acid donor that suitably acts as acidic crosslinking catalysts in the thermal crosslinking of the crosslinkable vinylidene fluoride copolymers once the electrode forming composition is applied onto the current collector in a process for preparing electrodes.

The at least one acid donor include, for example, Lewis acids, strong mineral acids, e.g., sulfuric acid, phosphoric acid, polyphosphoric acid, perchloric acid, and the like; saturated aliphatic hydrocarbon sulfonic acids and the aromatic hydrocarbon sulfonic acids, e.g., ethanesulfonic acid, propanesulfonic acid, benzenesulfonic acid, toluenesulfonic acid, naphthalenesulfonic acid, lower alkyl substituted benzenesulfonic acid, and the like.

Suitable Lewis acids here are inorganic or organic metal compounds in which the cation is preferably selected from the group consisting of boron, aluminium, tin, antimony and iron.

Of the Lewis acids mentioned, particular preference is given, in particular, to metal halide Lewis acids, e.g., boron trifluoride, aluminum chloride, zinc chloride, stannous chloride, antimony trichloride, ferric chloride, boron trifluoridedimethyl ether complex, boron trifluoride-diethyl ether complex, boron trifluoride-dipropyl ether complex, and the like, with stannous chloride being particularly preferred.

The Lewis acids include not only Lewis acids themselves but also metals or metal compounds which impart a function of Lewis acid, for example oxides and sulfides, antimony trioxide ($Sb_2O_3$), zinc oxide (ZnO) and zinc sulfide (ZnS) being preferred.

The acidic crosslinking agent is preferably comprised in composition (C) in an amount comprised between 0.001 and 2.0% by weight, more preferably comprised between 0.005 and 0.5% by weight, with respect to the total solid content of composition (C).

The electrode forming compositions of the present invention may further include at least one water scavenger.

Without wishing to be bound to by any theory, the inventors believe that the presence of at least one water scavenger may help the crosslinking reaction between the side chains of polymer (A) including hydroxyl groups and those including carboxyl group by capturing the water produced during the crosslinking and promoting the condensation reaction.

Suitable water scavengers for use in the electrode forming composition of the present invention are anhydrous alumino-silicates, Zeolites in particular.

Zeolites suitable for the purposes of the present invention comprise all those natural or synthetic, and preferably synthetic, crystalline inorganic materials having a highly ordered structure with a three-dimensional network of $SiO_4$ and $AlO_4$ tetrahedra, which are linked by common oxygen atoms.

Preferred Zeolites are those having a chemical composition in the anhydrous state corresponding to the general formula:

$$M_xD_{y/2} \cdot Al_mSi_nO_{2(m+n)}$$

wherein M and D are monovalent and bivalent ions of metals, usually alkaline or alkaline-earth metals, partly or totally exchangeable with H+ or $NH_4$ ions. In the formula, m can assume any value less than n. Putting n equal to 1, m can vary from 1 to 0.0001. In this respect, the following are suitable: synthetic aluminosilicate materials having a structure similar or analogous to natural products; aluminosilicate materials known only as synthetic and having a zeolite structure; synthetic materials based on silica, SiO2, in which the molar Si/Al ratio is high, or in which Al is contained in traces, or in which aluminium is replaced by elements of which the oxides have an amphoteric character, such as Be, B, Ti, Cr, Mn, Zr, V, Sb or Fe, these materials having a highly porous crystalline structure of zeolite type. A description of the structure and properties of zeolites and a systematic classification is given in the literature by D. W. Breck in "Zeolite Molecular Sieves" published by J. Wiley & Sons, N.Y., 1973.

The Zeolites are generally used in the acidic form or in neutral alkali form.

In the Zeolites, other elements, such as B, Ga, Fe, Cr, V, As, Sb, Bi or Be or mixtures thereof may be incorporated in the framework instead of aluminum, or the silicon can be replaced by another tetravalent element, such as Ge, Ti, Zr, or Hf.

The water scavenger is preferably comprised in composition (C) in an amount comprised between 0.01% by weight to 5% by weight preferably 0.1% by weight to 1% by weight with respect to the total solid content of composition (C).

The electrode-forming composition of the invention can be used in a process for the manufacture of an electrode, said process comprising:
 (i) providing a metal substrate having at least one surface;
 (ii) providing an electrode-forming composition (C) as defined above;
 (iii) applying the composition (C) provided in step (ii) onto the at least one surface of the metal substrate provided in step (i), thereby providing an assembly comprising a metal substrate coated with said composition (C) onto the at least one surface;
 (iv) drying the assembly provided in step (iii).

The metal substrate is generally a foil, mesh or net made from a metal, such as copper, aluminium, iron, stainless steel, nickel, titanium or silver.

Under step (iii) of the process of the invention, the electrode forming composition is applied onto at least one surface of the metal substrate typically by any suitable procedures such as casting, printing and roll coating.

Optionally, step (iii) may be repeated, typically one or more times, by applying the electrode forming composition provided in step (ii) onto the assembly provided in step (iv).

Step (iv) is suitably carried out at a temperature comprised between 50° C. to 200° C., preferably between 80° C. to 180° C., for a time of between 5 minutes and 48 hours, preferably between 30 minutes and 24 hours.

Under step (iv), a thermal crosslinking involving reaction of at least a portion of the hydroxyl groups of recurring units derived from monomer (HA) with at least a portion of the carboxyl groups of recurring units derived from monomer (CA) in polymer (A) occurs.

Thanks to the crosslinking reaction between the side chains of polymer (A) including hydroxyl groups and those including carboxyl group, the adhesion between the polymer (A) and the electrode active material contained in the electrode, along with the adhesion between the polymer (A) and the current collector, is improved. Accordingly, compared with methods using special additives, methods involving complicated steps, and the like, adhesion can be more easily improved.

The assembly obtained at step (iv) may be further subjected to a compression step, such as a calendaring process, to achieve the target porosity and density of the electrode.

Preferably, the assembly obtained at step (iv) is hot pressed, the temperature during the compression step being comprised from 25° C. and 130° C., preferably being of about 90° C.

Preferred target porosity for the obtained electrode is comprised between 15% and 40%, preferably from 25% and 30%. The porosity of the electrode is calculated as the complementary to unity of the ratio between the measured density and the theoretical density of the electrode, wherein:
 the measured density is given by the mass divided by the volume of a circular portion of electrode having diameter equal to 24 mm and a measured thickness; and the theoretical density of the electrode is calculated as the sum of the product of the densities of the components of the electrode multiplied by their volume ratio in the electrode formulation.

In a further instance, the present invention pertains to the electrode obtainable by the process of the invention.

Therefore the present invention relates to an electrode comprising:

a metal substrate, and directly adhered onto at least one surface of said metal substrate, at least one layer consisting of a composition comprising:

(a) at least one vinylidene fluoride (VDF) copolymer [polymer (A)] that comprises:
(i) recurring units derived from vinylidene fluoride (VDF);
(ii) recurring units derived from at least one hydroxyl group-containing vinyl monomer (HA);
(iii) recurring units derived from at least one carboxyl group-containing vinyl monomer (CA);
wherein the total amount of recurring units derived from monomer (HA) and recurring units derived from monomer (CA) in said polymer (A) is of at most 10.0% by moles, preferably at most 5.0% by moles, more preferably at most 1.5% by moles, with respect to the total moles of recurring units of polymer (A); and
wherein a fraction of at least 40% of recurring units derived from monomer (HA) and a fraction of at least 40% of recurring units derived from monomer (CA) are randomly distributed into said polymer (A); and (b) at least one electro-active material (AM).

The layer of the electrode of the invention typically has a thickness comprised between 10 µm and 500 µm, preferably between 50 µm and 250 µm, more preferably between 70 µm and 150 µm.

The electrode-forming composition (C) of the present invention is particularly suitable for the manufacturing of positive electrodes for electrochemical devices.

The electrode of the invention is particularly suitable for use in electrochemical devices, in particular in secondary batteries, comprising said electrode.

For the purpose of the present invention, the term "secondary battery" is intended to denote a rechargeable battery. The secondary battery of the invention is preferably an alkaline or an alkaline-earth secondary battery. The secondary battery of the invention is more preferably a Lithium-ion secondary battery. An electrochemical device according to the present invention can be prepared by standard methods known to a person skilled in the art.

Should the disclosure of any patents, patent applications, and publications which are incorporated herein by reference conflict with the description of the present application to the extent that it may render a term unclear, the present description shall take precedence.

The invention will be now described with reference to the following examples, whose purpose is merely illustrative and not intended to limit the scope of the invention.

EXPERIMENTAL PART

Raw Materials

Comparative polymer 1: VDF-AA (0.9% by moles) polymer having an intrinsic viscosity of 0.30 l/g in DMF at 25° C. and a $T_{2f}$ of 162° C., obtained as described in WO 2008/129041.

Polymer A-1: VDF-AA (0.5% by moles)-HEA (0.1% by moles) polymer having an intrinsic viscosity of 0.32 l/g in DMF at 25° C. and a $T_{2f}$ of 165.4° C.

Initiator agent (TAPPI): t-amyl-perpivalate in isododecane (a 75% by weight solution of t-amyl perpivalate in isododecane), commercially available from Arkema.

Bermocoll® E230FQ from AkzoNobel

Active material NMC: $LiNi_{0.6}Co_{0.2}Mn_{0.2}O_2$, commercially available from Umicore SA.

Active material LCO: Lithium Cobalt Oxide ($LiCoO_2$), commercially available from Umicore SA.

Electroconductivity-imparting additive: C-NERGY™ SUPER C65 (SC-65), commercially available from Imerys Graphite & Carbon.

Determination of Intrinsic Viscosity of Polymer

Intrinsic viscosity (η) [dl/g] was measured using the following equation on the basis of dropping time, at 25° C., of a solution obtained by dissolving the polymer in N,N-dimethylformamide at a concentration of about 0.2 g/dl using a Ubbelhode viscosimeter:

$$[\eta] = \frac{\eta_{sp} + \Gamma \cdot \ln \eta_r}{(1+\Gamma) \cdot c}$$

where c is polymer concentration [g/dl], $\eta_r$ is the relative viscosity, i.e. the ratio between the dropping time of sample solution and the dropping time of solvent, $\eta_{sp}$ is the specific viscosity, i.e. $\eta_r$-1, and Γ is an experimental factor, which for polymer (A) corresponds to 3.

DSC Analysis

DSC analyses were carried out according to ASTM D 3418 standard; the melting point ($T_{f2}$) was determined at a heating rate of 10° C./min.

Preparation of Polymer A-1: VDF-AA-HEA

In a 4 liters reactor equipped with an impeller running at a speed of 650 rpm were introduced in sequence, the demineralised water (2237 g) and 0.6 g/kg Mni (initial of monomers added in reactor before the set point temperature) of Bermocoll® E230FQ. The reactor was purged with sequence of vacuum (30 mmHg) and purged of nitrogen at 20° C. Then 2.65 g of TAPPI was introduced. At a speed of 880 rpm, acrylic acid (0.28 g) and hydroxyethyl acrylate (0.07 g) were introduced. Finally, 1166 g of vinylidene fluoride (VDF) was introduced in the reactor. The reactor was gradually heated until a set-point temperature at 50° C. was fixed at 120 bar. The pressure was kept constantly equal to 120 bar by feeding during the polymerization an aqueous solution containing acrylic acid and hydroxyethyl acrylate. After feeding 6.37 g of acrylic acid and 1.59 g of hydroxyethyl acrylate, no more aqueous solution was introduced and the pressure started to decrease. The polymerization was stopped after 9 hours by degassing the reactor until reaching atmospheric pressure. A conversion of monomers of 82% was reached. The polymer so obtained was then recovered, washed with demineralised water and dried at 65° C. during all the night.

General Preparation of the Electrodes with NMC Active Material

In order to compare the adhesion behaviour of Comparative polymer 1 and polymer A-1, compositions were prepared by pre-mixing for 10 minutes in a centrifugal mixer 14.9 g of a 8% by weight solution of a polymer (A-1 and comparative 1) in NMP, 115.4 g of NMC, 2.4 g of SC-65 and 21.9 g of NMP.

The mixtures were then mixed using a high speed disk impeller at 2000 rpm for 1 hour. Positive electrodes were obtained by casting the so obtained compositions on 20 μm thick Al foil with a doctor blade and drying the coating layers so obtained in a vacuum oven at temperature of 130° C. for about 70 minutes. The thickness of the dried coating layers was about 110 μm.

Positive electrodes having the following compositions were obtained:

Electrode E1: 97% by weight of NMC, 1% by weight of Comparative polymer 1, 2% by weight of conductive additive.

Electrode E2: 97% by weight of NMC, 1% by weight of polymer F-1, 2% by weight of conductive additive.

General Preparation of the Electrodes with NMC/LCO Blend Active Material

In order to compare the adhesion behaviour of Comparative polymer 1 and polymer A-1, compositions were prepared by pre-mixing for 10 minutes in a centrifugal mixer 14.9 g of a 8% by weight solution of a polymer (A-1 and comparative 1) in NMP, 11.55 g of NMC, 103.9 g of LCO, 2.4 g of SC-65 and 21.9 g of NMP.

The mixtures were then mixed using a high speed disk impeller at 2000 rpm for 1 h. Positive electrodes were obtained by casting the so obtained compositions on 20 μm thick Al foil with a doctor blade and drying the coating layers so obtained in a vacuum oven at temperature of 130° C. for about 70 minutes. The thickness of the dried coating layers was about 110 μm.

Positive electrodes having the following compositions were obtained:

Electrode E3: 9.7% by weight of NMC, 83.7% by weight of LCO, 1% by weight of Comparative polymer 1, 2% by weight of conductive additive.

Electrode E4: 9.7% by weight of NMC, 83.7% by weight of LCO, 1% by weight of polymer F-1, 2% by weight of conductive additive.

Adhesion Peeling Force Method

Peeling tests were performed on the electrodes prepared as above described, with the setup described in the standard ASTM D903 at a speed of 300 mm/min at 20° C. in order to evaluate the adhesion of the dried coating layer to the Al foil. The results for E1 and E2 are shown in Table 1. The results for E3 and E4 are shown in Table 2.

TABLE 1

| Electrode | Adhesion [N/m] | Normalized Adhesion [%] |
|---|---|---|
| E1 | 17.1 | 100 |
| E2 | 36.0 | 213 |

TABLE 2

| Electrode | Adhesion [N/m] | Normalized Adhesion [%] |
|---|---|---|
| E3 | 66.5 | 100 |
| E4 | 105 | 157 |

The results surprisingly show that the electrodes prepared by using polymer A-1 as binder, wherein polymer A-1 has the recurring units deriving both from monomer AA and from monomer HEA uniformly distributed in the polymer backbone, have a much higher adhesion to metal foil than that obtained by using Comparative polymer 1, which only has the recurring units deriving from monomer AA uniformly distributed in the polymer backbone.

The invention claimed is:

1. An electrode-forming composition (C) comprising:
   a. at least one vinylidene fluoride (VDF) copolymer [polymer (A)] that comprises:
      (i) recurring units derived from vinylidene fluoride (VDF);
      (ii) recurring units derived from at least one hydroxyl group-containing vinyl monomer (HA);
      (iii) recurring units derived from at least one carboxyl group-containing vinyl monomer (CA);
      wherein a total amount of recurring units derived from monomer (HA) and recurring units derived from monomer (CA) in said polymer (A) is of at most 1.5% by moles, with respect to a total moles of recurring units of polymer (A); and wherein a fraction of at least 40% of recurring units derived from monomer (HA) and a fraction of at least 40% of recurring units derived from monomer (CA) are randomly distributed into said polymer (A);
   b. at least one electro-active material (AM); and
   c. at least one solvent(S).

2. The electrode-forming composition (C) according to claim 1 wherein the hydroxyl group-containing vinyl monomer (HA) is a compound of formula (I):

wherein:
   $R_1$, $R_2$ and $R_3$, equal to or different from each other, are independently selected from a hydrogen atom, a halogen atom, and a $C_1$-$C_3$ hydrocarbon group and $R_{OH}$ is a $C_2$-$C_{10}$ hydrocarbon chain moiety comprising at least one hydroxyl group and optionally containing in the chain one or more oxygen atoms, carbonyl groups or carboxy groups.

3. The electrode-forming composition (C) according to claim 2 wherein monomer (HA) is a compound of formula (Ia):

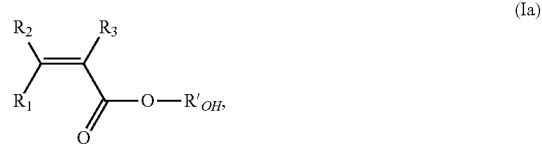

wherein
   $R_1$, $R_2$ and $R_3$, equal to or different from each other, are independently selected from a hydrogen atom and a $C_1$-$C_3$ hydrocarbon group and $R'_{OH}$ is a $C_1$-$C_5$ hydrocarbon moiety comprising at least one hydroxyl group.

4. The electrode-forming composition (C) according to claim 3 wherein monomer (HA) of formula (Ia) is selected from the group consisting of
   hydroxyethyl(meth)acrylate (HEA),
   2-hydroxypropyl acrylate (HPA),
   hydroxyethylhexyl(meth)acrylate,
   and mixtures thereof.

5. The electrode-forming composition (C) according to claim 1 wherein the carboxyl group-containing vinyl monomer (CA) is a compound of formula (II):

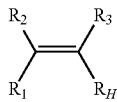
(II)

wherein:
$R_1$, $R_2$ and $R_3$, equal to or different from each other, are independently selected from a hydrogen atom and a $C_1$-$C_3$ hydrocarbon group and $R_H$ is a $C_1$-$C_{10}$ hydrocarbon chain moiety comprising at least one carboxyl group.

6. The electrode-forming composition (C) according to claim 5 wherein monomer (CA) is a compound of formula (IIa):

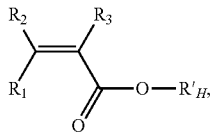
(IIa)

wherein
$R_1$, $R_2$ and $R_3$, equal to or different from each other, are independently selected from a hydrogen atom and a $C_1$-$C_3$ hydrocarbon group and $R'_H$ is a hydrogen or $C_1$-$C_5$ hydrocarbon moiety comprising at least one carboxyl group.

7. The electrode-forming composition (C) according to claim 6 wherein monomer (CA) of formula (IIa) is selected from the group consisting of acrylic acid (AA), (meth)acrylic acid and mixtures thereof.

8. The electrode-forming composition (C) according to claim 1 wherein a molar ratio between monomer (HA) and monomer (CA) in polymer (A) is in the range from 20:1 to 1:20.

9. The electrode-forming composition (C) according to claim 1 which further comprises recurring units derived from one or more fluorinated comonomers (CF) different from VDF.

10. The electrode-forming composition (C) according claim 1 comprising:
from 0.5% by weight to 10% by weight of polymer (A); and
from 80% by weight to 99% by weight, of the at least one electro active material (AM), wherein all percentages being weight percentages with respect to a total solid content of composition (C).

11. The electrode-forming composition (C) according to claim 1 further comprising at least one acid donor.

12. The electrode-forming composition (C) according to claim 1 wherein the composition is a positive electrode forming composition, wherein said at least one electro-active material (AM) is selected from lithium-containing complex metal oxides of general formula (III)

(III)

wherein M1 and M2 are the same or different from each other and are transition metals selected from Co, Fe, Mn, Cr and V, $0.5 \leq x \leq 1$, wherein $y+z=1-x$, and Y denotes a chalcogen.

13. A process for the manufacture of an electrode, said process comprising:
(i) providing a metal substrate having at least one surface;
(ii) providing an electrode-forming composition (C) according to claim 1;
(iii) applying the composition (C) provided in (ii) onto the at least one surface of the metal substrate provided in (i), thereby providing an assembly comprising a metal substrate coated with said composition (C) onto the at least one surface; and
(iv) drying the assembly provided in (iii).

14. An electrode obtained by the process according to claim 13 said electrode comprising:
a metal substrate, and
directly adhered onto at least one surface of said metal substrate, at least one layer consisting of a composition comprising:
(a) at least one vinylidene fluoride (VDF) copolymer [polymer (A)] that comprises:
(i) recurring units derived from vinylidene fluoride (VDF);
(ii) recurring units derived from at least one hydroxyl group-containing vinyl monomer (HA);
(iii) recurring units derived from at least one carboxyl group-containing vinyl monomer (CA);
wherein a total amount of recurring units derived from monomer (HA) and recurring units derived from monomer (CA) in said polymer (A) is of at most 10.0% by moles, with respect to a total moles of recurring units of polymer (A); and
wherein a fraction of at least 40% of recurring units derived from monomer (HA) and a fraction of at least 40% of recurring units derived from monomer (CA) are randomly distributed into said polymer (A); and
(b) at least one electro-active material (AM).

15. An electrochemical device comprising at least one electrode according to claim 14.

16. The electrochemical device according to claim 15, said electrochemical device being a secondary battery comprising a positive electrode and a negative electrode, wherein at least one of the positive electrode and the negative electrode is the electrode.

* * * * *